Dec. 26, 1967      W. S. KINNARD      3,360,656
FILTER ATTACHMENT FOR PHOTOELECTRIC LIGHT METERING APPARATUS
Filed Sept. 15, 1964
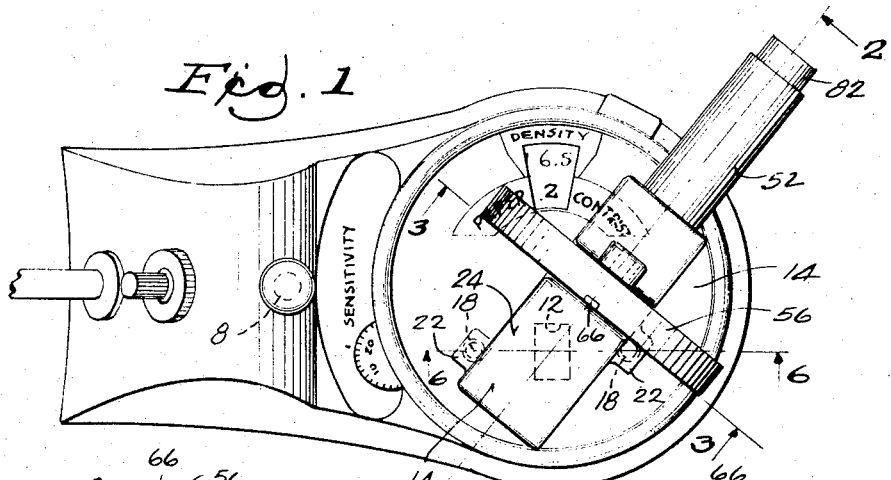
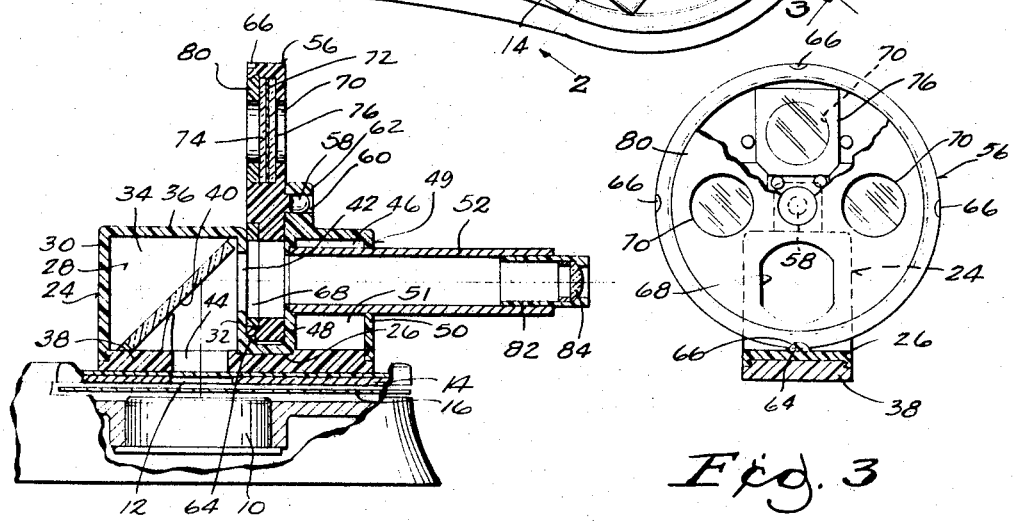
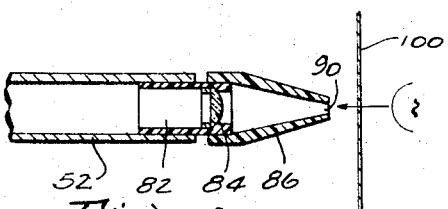
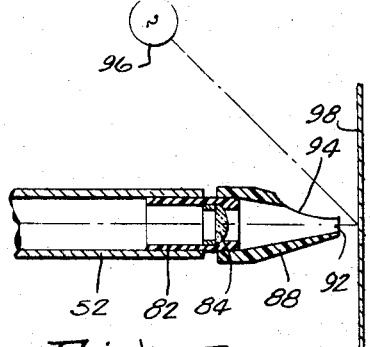
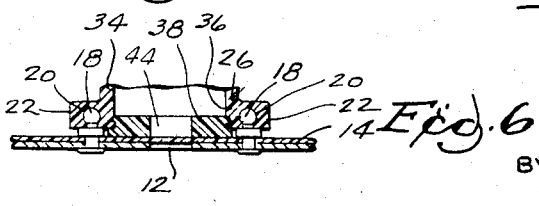
INVENTOR
WOLCOTT S. KINNARD
BY Wheeler, Wheeler & Wheeler
ATTORNEYS

United States Patent Office 3,360,656
Patented Dec. 26, 1967

3,360,656
FILTER ATTACHMENT FOR PHOTOELECTRIC LIGHT METERING APPARATUS
Wolcott S. Kinnard, 4665 N. 56th St., Milwaukee, Wis. 53218
Filed Sept. 15, 1964, Ser. No. 396,634
5 Claims. (Cl. 250—226)

ABSTRACT OF THE DISCLOSURE

A filter attachment for a light meter on a photographic enlarger or the like which makes the meter sensitive to various colors of horizontal light. The attachment has a horizontal lens tube, a color filter wheel, and a mirror housing to direct horizontal light through the filter wheel and down onto the photocell of the light meter. The lens tube and mirror housing are mounted on a flexible base so that the filter wheel can be removed.

---

This invention relates to an attachment for light metering apparatus to take localized "off-the-easel" density or color balance evaluation readings directly from a negative or print or ground glass.

In my copending application Ser. No. 114 filed Jan. 4, 1960, now Patent No. 3,187,652, and entitled, "Light Metering Apparatus," I have disclosed an arrangement whereby relative light requirements and paper contrast requirements for enlarging purposes can be measured by determining the relative amounts of light projected on the instrument from the enlarging lamp through selected portions of a negative. The light to be measured falls upon a photosensitive cell after traversing a special form of neutral density wedge, the adjustment of which measures the intensity of the light projected through the selected portion of the negative to be printed.

The present invention contemplates an attachment which is applicable to and removable from the instrument disclosed in the above entitled application, the attachment including a reflector registering with the sensitive cell of the instrument, a generally horizontal light receiving tube leading to the mirror and an intervening color wheel having various filters for selective use in color evaluation.

In the drawings:

FIG. 1 is a plan view showing the attachment in place on the instrument disclosed in application Serial No. 114.

FIG. 2 is an enlarged view in which the attachment and portions of the instrument are shown in section in the plane indicated at 2—2 in FIG. 1, portions of the basic instrument being shown in side elevation.

FIG. 3 is a fragmentary detail view taken in the plane indicated at 3—3 in FIG. 1, parts being broken away.

FIG. 4 is a diagrammatic view in section fragmentarily illustrating the light pickup tube and detachable tip with which the tube is provided.

FIG. 5 is a view similar to FIG. 4 but showing a different tip in use with different work.

FIG. 6 is a fragmentary detail view taken on the line 6—6 of FIG. 1.

The basic instrument disclosed in companion application Ser. No. 114 will not be described in detail. It comprises a cold cathode lamp 8 (shown at 25 in the patent) which glows as a result of light reaching the photosensitive cell 10 through the "window" 12 in horizontal panel 14, the light required to produce the glow effect being subject to the control of a variable area mask which, for the purposes of this application, may be regarded as a specialized form of density wedge 16 which is rotatable to provide progressive variation in the amount of light admitted to the cell.

Such an instrument is normally placed on the easel beneath an enlarging projector. In the instant device, it is made available for new uses in various other situations by reason of the attachment presently to be described.

The stationary dial 14 is equipped with a pair of posts 18 engageable by sockets 20 in the laterally projecting ears 22 with which the housing 24 is provided. The housing is preferably made of flexible synthetic resin to include a downwardly open base 26 from which the ears 22 project. On this base is a mirror chamber 28 formed by upstanding walls 30 and 32, side walls 34 and a top wall 36. The obliquely disposed mirror 40 receives light through the window opening 44 in the closure 38 at the bottom of the attachment. The attachment window 44 regisers with photocell 10 through the aperture 12 of the instrument on which the attachment is mounted by means of posts 18 and sockets 20.

Spaced forwardly on the base 26 from the chamber 28 is a forward section of the housing, wherein there is a cavity 46 defined by the upright walls 48 and 50 and side walls 51 which, in the instant embodiment, are in the planes of the side walls 34 above described. The flexible base 26 is all that connects the forward section of the housing 24 with the rearward section thereof. The closure 38 extends beneath cavity 46 but the cavity plays no part in the apparatus except to reduce the amount of material required to construct the housing. The cavity is spanned by a light receiving tube at 52 which is mounted in walls 48 and 50 and is aligned with the window 42 in the forward wall 32 of chamber 28.

Between the forward wall 32 of the rear section and the rear wall 48 of the forward section 49 of the housing there is a transverse channel in which the filter wheel 56 is rotatable. The wheel includes a bearing boss 58 engaged in a socket 60 in the ear 62 which projects above the forward section of the housing and terminates in substantial registry with wall 48. Positioning detent means is provided by a lug at 64 integral with wall 32 in the rearward section of housing 24 and with which the notches 66 in the periphery of the wheel 56 are engaged when any one of the wheel openings hereinafter described is in registry with the window 422.

The number of openings in the wheel 56 is broadly immaterial. Four such openings have been illustrated, one of which at 68 is entirely unobstructed and somewhat larger than the other openings 70, in which filters 72 are mounted. Preferably, each such filter comprises a color film confined between glasses 74 and 76 as best shown in FIG. 2, the assembly being thereupon confined by a ring 80 which is detachably snapped into place and held frictionally in the wheel 56.

At the outer end of the light receiving tube 52 is a lens barrel 82 having a small lens 84 mounted in it, the barrel being sleeved inside the tube 52 and projecting therefrom to support interchangeable tips, one of which is shown at 86 in FIG. 4 and another of which is shown at 88 in FIG. 5. The tip has a conical extremity with a very small aperture at 90. The tip 88 is likewise conical and tapers to a terminal aperture at 92 but has an opening 94 in a side wall relieved at 94 as clearly appears in FIG. 5, the object being to eliminate shadows which would otherwise be cast by the tip 88 as a result of intercepting light between the lamp source 96 and the opaque work 98. The work sheet 100 in FIG. 4 is transparent and may comprise a negative or the ground glass of a camera or the like.

The color wheel 56 is preferably used whether or not color readings are to be taken, since the structure of the wheel around the window opening 68 excludes extraneous light and permits only the light which has traversed the lens 84 to reach the mirror 40 and to be reflected through the window 12 and the variable density wedge 16 onto the photosensitive cell 10.

In practice, the filter cell 56 is equipped with No. 70, No. 98, or No. 99 Wrattan filters although for various purposes a No. 93 is substituted for a No. 99 and/or a No. 94 may be substituted for a No. 98.

The use of the attachment permits of very effective quality control.

For use in taking comparative readings of reflection densities, as in FIG. 5, the tip 88 is mounted on the lens barrel 82. The work 98 is illuminated from a single source of such intensity and distance from the work that the amount of light reflected will not be too big or too small for measurement by the basic instrument as a portion of the reflected light traverses the attachment and is projected onto the photosensitive cell 10 as above described. It will be found that the amount of light reflected will vary according to the character of the opaque work sheet. Assuming that this is a piece of enlarging paper, the light reflected will not only be reflected from the surface but will involve inter-reflections between the baryta layer and the gelative emulsion layer. Separate readings may be taken from selected areas by using the pointed tip. By recording the reading at a given point, quality can be reproduced at will regardless of changes in the type of paper used. In addition, the readings will facilitate defining limits between highlights and shadows to give the best results on all types of paper.

I claim:

1. An attachment for light metering apparatus, said attachment comprising a housing having two sections, one of said sections having a light admitting opening and the other of said sections having a light discharging opening, and a color wheel rotatable between said sections, said housing including a wheel-confining channel between said sections, one of said sections and said wheel having complementary bearing means for determining the axis of rotation of said wheel, in which said housing includes a flexible base upon which said sections are mounted, the bearing means including a socket and a stud disposed axially of the wheel and engaged in said socket, the socket and stud being engageable and disengageable upon the flexing of said base, the wheel being normally confined in said channel between said sections and said stud being thereby precluded from axial displacement from said socket.

2. An attachment of the character described comprising a base of flexible material having downwardly opening sockets, housing sections independently mounted on the base and relatively movable upon the flexing of the base, a rotatable filter wheel between said sections having means mounting it for rotation, one of said sections being open at its bottom, a mirror positioned in the last mentioned section, a closure for the downwardly open bottom of said section having mirror positioning means and provided with a window opening downwardly in registry with said mirror, said last mentioned section further having a forwardly directed opening registering with said mirror, the other of said sections being provided with a forwardly directed tube in registry with said last mentioned opening for admitting light to said mirror for reflection downwardly through said base.

3. An attachment according to claim 2 in which the tube is provided with a lens.

4. An attachment according to claim 2 in which the color wheel rotatably mounted between said sections has ports selectively registrable with said tube, one of said ports being unobstructed and another of said ports having a filter for modifying light passing between said tube and said mirror.

5. An attachment according to claim 4 in which said wheel and one of said sections having axially engageable and releasable stud and socket means for defining the axis of rotation of the wheel, said stud and socket means being maintained in engagement with the wheel, the wheel being normally confined between said sections and being releasable for axial disengagement of the stud and socket means when said base is flexed to free the wheel from confinement between said sections.

References Cited

UNITED STATES PATENTS

| | | | |
|---|---|---|---|
| 2,147,156 | 2/1939 | Geffcken et al. | 250—239 X |
| 2,216,031 | 9/1940 | Bennett | 350—68 |
| 2,511,334 | 6/1950 | Gruber | 350—134 |
| 2,971,430 | 2/1961 | Rohner et al. | 250—226 X |

OTHER REFERENCES

Welch: "Densichron," Welch Scientific Co., Chicago, Ill., August 1961, pp. 9 and 10 relied on.

WALTER STOLWEIN, *Primary Examiner.*

RALPH G. NILSON, *Examiner.*

J. D. WALL, *Assistant Examiner.*